United States Patent
Blam et al.

(10) Patent No.: US 6,738,923 B1
(45) Date of Patent: May 18, 2004

(54) NETWORK STATION ADJUSTABLE FAIL-OVER TIME INTERVALS FOR BOOTING TO BACKUP SERVERS WHEN TRANSPORT SERVICE IS NOT AVAILABLE

(75) Inventors: Norbert M. Blam, Austin, TX (US); James Arthur Brewer, Leander, TX (US); Charles Edward Tysor, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 09/656,672

(22) Filed: Sep. 7, 2000

(51) Int. Cl.[7] .......................... G06F 11/00; G06F 15/16
(52) U.S. Cl. .............................. 714/4; 714/18; 714/55; 709/234
(58) Field of Search ..................... 714/4, 13, 18, 714/55, 749; 709/234

(56) References Cited

U.S. PATENT DOCUMENTS

| | | | | |
|---|---|---|---|---|
| 5,774,479 A | * | 6/1998 | Lee et al. | 714/749 |
| 6,014,707 A | * | 1/2000 | Miller et al. | 709/232 |
| 6,112,323 A | * | 8/2000 | Meizlik et al. | 714/748 |
| 6,154,849 A | * | 11/2000 | Xia | 714/4 |
| 6,363,496 B1 | * | 3/2002 | Kwiat | 714/4 |
| 6,405,337 B1 | * | 6/2002 | Grohn et al. | 714/749 |
| 6,467,048 B1 | * | 10/2002 | Olarig et al. | 714/7 |

* cited by examiner

Primary Examiner—Robert Beausoliel
Assistant Examiner—Emerson Puente
(74) Attorney, Agent, or Firm—Duke W. Yee; J. Bruce Schelkopf; Catherine K. Kinslow

(57) ABSTRACT

A method for adjusting failover intervals in a computer network is provided. In one embodiment of the present invention transport protocol requests are sent to a backup server, receiving response messages from the server, and then the rate of transport protocol requests is adjusted according to the response messages.

13 Claims, 3 Drawing Sheets

NETWORK STATION ADJUSTABLE FAIL-OVER TIME INTERVALS FOR BOOTING TO BACKUP SERVERS WHEN TRANSPORT SERVICE IS NOT AVAILABLE

BACKGROUND OF THE INVENTION

1. Technical Field

The present invention relates to fault tolerant operations in a computer network, in which network stations boot off of remote backup servers.

2. Description of Related Art

Communication between computers in a network often involves the loss of information packets due to hardware failure. The recovery and retransmission of these lost packets is of central concern in fault tolerant operations, in which the network must continue to function despite failure in some of its components.

When failure occurs in a component of a fault tolerant network, such as a server, certain functions must be shifted to alternate servers within the network. The speed with which this process occurs is referred to as the failover time interval. This interval depends on several factors, including the number of alternate servers within the network, the number of transport retries used to access a specific server, and the time intervals, known as time-outs, between transport retries.

In current fault tolerant networks, the length of time-outs and failover intervals is fixed. However, fixed time-outs and failover intervals might be counterproductive depending on the circumstances and the demands placed on the network. Different situations will require different failover intervals in order to optimize the performance of the network.

An example of a situation requiring a fast failover interval is a retail environment. In this case, if a failure in a server caused the network station(s) to be rebooted, the checkout clerk and customers would obviously want a quick failover interval to the next available server. However, there are situations in which a short failover interval is not wanted.

An example of a situation requiring a longer failover interval is a peer-booted environment. In peer booting, a network station boots from either a remote server or its own internal flash card. (A flash card is a module that can hold computer memory without external power.) Once this first network station is booted, the other network stations will then boot from its flashcard. In essence, the first network station becomes the server for the other network stations. A quick failover interval would create problems in this situation, because the peer-booted machines must wait until the network station with the flashcard is fully booted and responding to transport protocol requests before they can boot from it. Therefore, a delay in the failover would allow the first network computer to get up and running before it had to handle transport requests from the other computers in the network.

The same computer network might require different failover intervals depending on the circumstances. In the peer booting example, a quick failover might be called for if only one or a few network stations needed to be rebooted. However, if the entire network lost power, then a longer failover is needed to allow the first network station to fully boot, before the others can peer boot from its flashcard.

Present fault tolerant networks do not have the ability to adjust their time-outs and failover intervals according to the circumstances. Therefore, a method for adjusting time-outs and failover intervals according to the requirements of different systems, as well as different circumstances for the same system, is desirable.

SUMMARY OF THE INVENTION

The present invention provides a method for adjusting failover intervals in a computer network. In one embodiment of the present invention transport protocol requests are sent to a backup server, receiving response messages from the server, and then the rate of transport protocol requests is adjusted according to the response messages.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
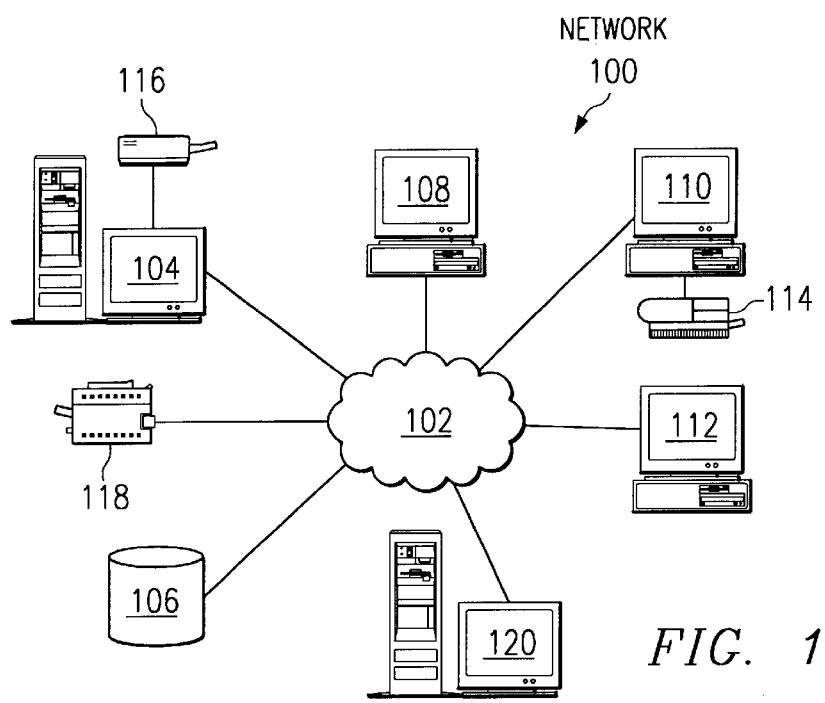
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections. In the depicted example, server 104 is connected to network 102, along with storage unit 106. In addition, clients 108, 110 and 112 are also connected to network 102. These clients, 108, 110 and 112, may be, for example, personal computers or network computers.

For purposes of this application, a network computer is any computer coupled to a network that receives a program or other application from another computer coupled to the network. In the depicted example, server 104 provides data, such as boot files, operating system images and applications, to clients 108–112. Clients 108, 110 and 112 are clients to server 104. In the example of this application, server 120 has been included as an additional backup to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
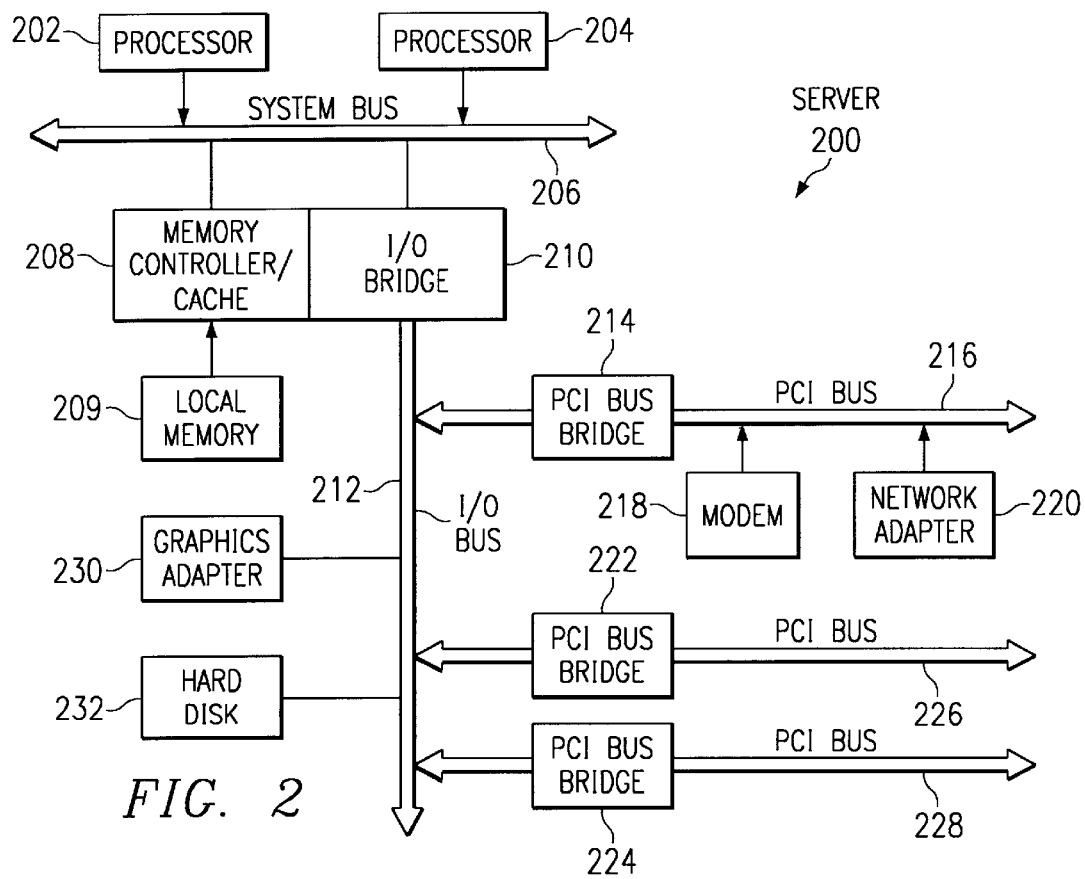
FIG. 2 depicts a block diagram of a data processing system which may be implemented as a server, such as server 104 in FIG. 1, in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
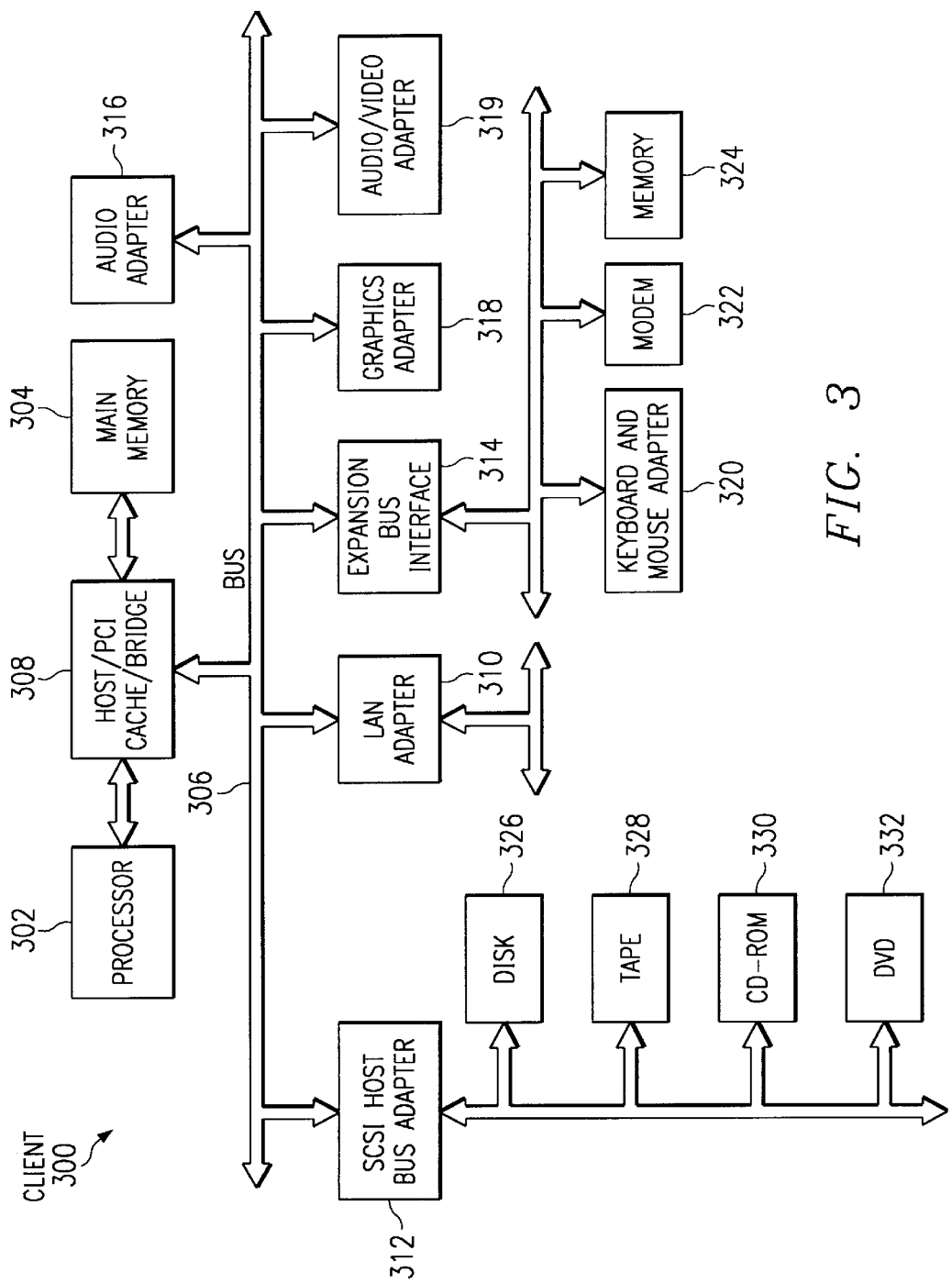
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
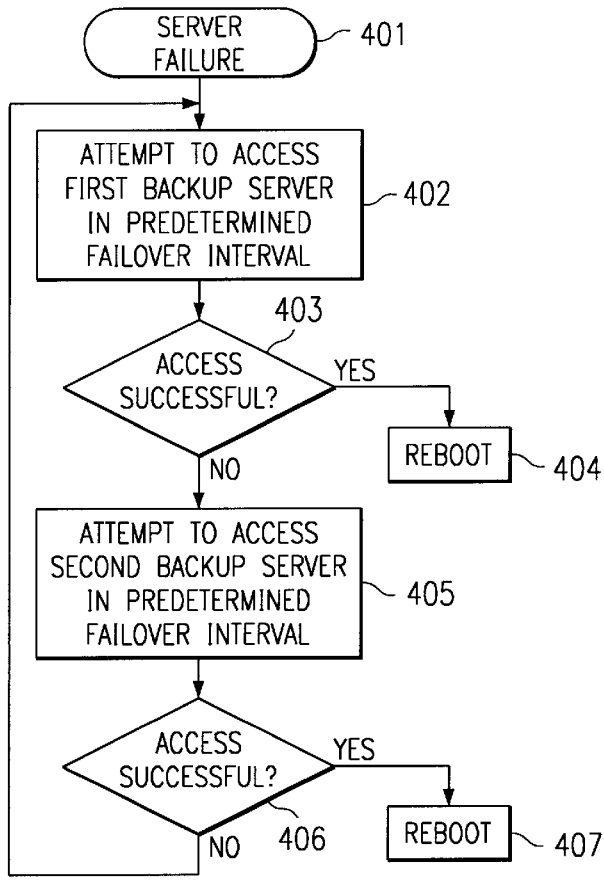
FIG. 4 depicts a flowchart illustrating the typical method of using fixed failover intervals for booting to a backup server in accordance with the prior art.

With reference to FIG. 4, a flowchart illustrating a method for booting to backup servers is depicted in accordance with prior art. The example in FIG. 4 describes fault tolerant operations on a computer network having two backup boot servers. However, it must be pointed out that the process in FIG. 4 applies equally to computer networks with a greater or lesser number of backup boot servers.

The process begins when a server failure (step 401) within the network causes a network station relying on that server to be rebooted. In a fault tolerant operation, the computer network must be able to continue functioning despite hardware failure within the network. Therefore, the affected network station must be able to access an alternate server and resubmit the job to be performed. This process of accessing a backup server is known as failover.

The next step in the process is for the network station to attempt to access and boot from the first backup server in the network (step 402). This is accomplished by submitting transport protocol requests to the server and waiting for a response. If the server is not available at that time, it will respond with an Internet Control Message Protocol (ICMP) response stating that the destination is not available. ICMP is a standard TCP/IP protocol used to send error and control messages. The network station will then resubmit another transport request after a predetermined time-out period and wait for a response from the server. This process will continue until the server becomes available or a predetermined number of transport retries has been reached. The failover time interval is the product of the time-out length between transport retries and the number of transport retries.

If the first backup server does become available within the predetermined failover interval, then the network station can reboot from that server (step 404) and continue its job.

If, however, the first backup server cannot be accessed, then the network station must try to access and boot from the next backup server in the network (step 405). Again, the process will resemble that of step 402. The network station will submit a predetermined number of transport retries to the second backup server with a predetermined time-out between each retry. If the second backup server becomes available within this predetermined failover interval, the network station will reboot from that server (step 407). If the second backup server is not available after the predetermined failover interval, the network station will try to access the next backup server, and so on.

In the example of FIG. 4, the network has only two backup servers. Therefore, if the second backup server does not become available within the specified failover interval, the network station's boot code will go back to the first backup server and repeat the entire boot attempt sequence (step 408).

It is at this point that the prior art reaches its limitations and can present problems in a fault tolerant operation. Because the time-out and failover interval in the prior art are fixed, the computer network in question does not have the ability to adjust the failover interval according to the circumstances. For some networks, it may be advantageous to try the different backup servers quickly at first, and then use a longer failover interval as time goes on, in case the network is experiencing long delays.

A peer-booted environment is an example of a computer network requiring adjustable failover intervals. In peer booting, one of the network stations acts as the backup server from which the other network stations can reboot. If this backup station is functioning properly, it can accommodate a rapid failover to peer boot the other network stations.

However, if power was lost to the whole network, then the backup station itself would need to reboot, either from a remote server or an internal flash card capable of holding memory without power. Therefore, the peer-booted network stations would have to wait for the backup station to finish booting before they can boot from it. Under these circumstances, a longer failover interval would be more appropriate. Unfortunately, the prior art does not provide this type of flexibility in adjusting failover intervals.

Figure 5:
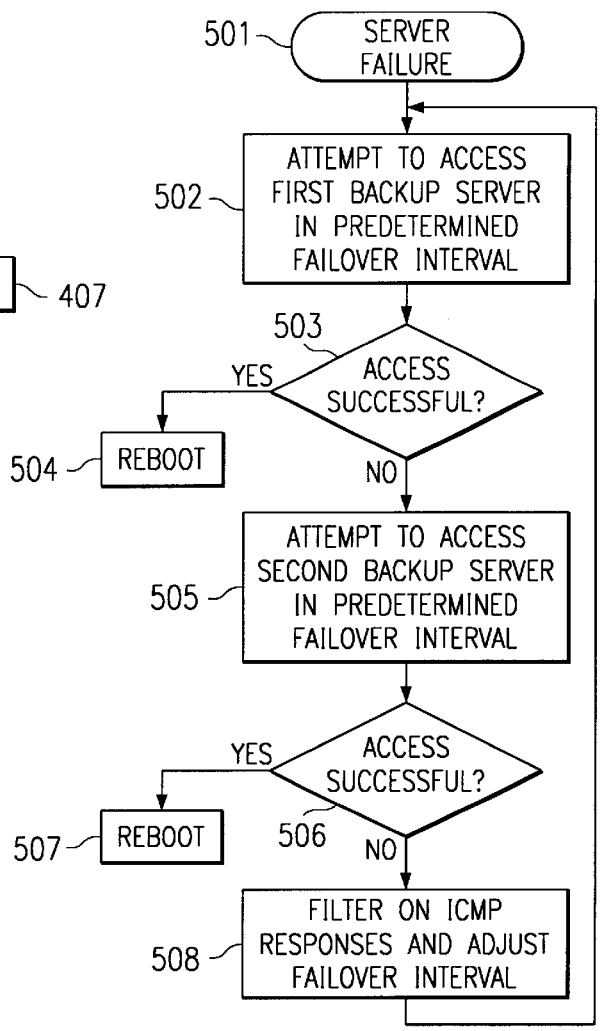
FIG. 5 depicts a flowchart illustrating an exemplary method of adjusting failover intervals for booting to backup servers in accordance with the present invention.

With reference now to FIG. 5, a flowchart illustrating an exemplary method of adjusting failover intervals for booting to backup servers is depicted in accordance with the present invention. As with FIG. 4, the example in FIG. 5 describes fault tolerant operations in a computer network with two backup servers, such as, for example, network 102 in FIG. 1. Again, it must be pointed out that the present invention is equally applicable to computer networks with a greater or lesser number of backup servers.

The method of the present invention follows many of the same steps as the prior art. A server failure (step 501) causes any affected network station to attempt to access the first backup server in the network, within a predetermined failover interval (step 502). This backup server could be a another network station, as in a peer-booted environment. If the first backup server is available, the network station can reboot (step 504). If the first backup server is not available, then the next step is to attempt to access the second backup server in the network, within a predetermined failover interval (step 505). Again, if the second backup server is available, then the network station can reboot from it (step 507). However, what if the second backup server is not available?.

In the prior art, if the second backup server is not available, the boot attempt sequence is simply repeated, using the same predetermined failover intervals (step 408). By contrast, the present invention filters on the ICMP responses received from the backup servers during the transport retries and adjusts the failover intervals before repeating the boot attempt sequence (step 508). This adjustment in the failover time interval occurs according to the boot attempt counter and a failover acceleration factor by the formula:

$$F=\min(bp^{acc} \times t, t \times n)$$

where:
    F is the failover time interval
    $bp=1, 2, 3 \ldots BP_{max}$
    Notes:
        bp is the boot attempt counter.
        $BP_{max}$ is the maximum number of boot attempts.
        $BP_{max}$ could be set to infinity.
    acc=0, 1, 2, 3, 4, 5
    Notes:
        acc is the failover acceleration factor.
        acc=0 is the fastest failover (i.e. Failover time is a constant-t).
        acc=5 defaults to the slowest failover of t×n
        acc=1, 2, 3, 4 causes a failover in between the fastest and slowest.
    t is the time-out for each transport protocol retry.
    n is the total number of transport protocol retries.

As the boot attempt sequence is repeated, the failover interval might have to be lengthened in order to accommodate delays in the network. This flexibility facilitates efficient fault tolerant operations, even under adverse conditions such as, for example, congestion or power failure.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for adjusting failover intervals in a computer network, comprising:

submitting transport protocol requests to a backup server;

receiving response messages from the backup server; and adjusting the rate of transport protocol requests according to the response messages, wherein the step adjusting the rate of transport protocol requests includes providing an acceleration factor which is used in conjunction with ICMP responses and a boot attempt counter to determine the failover interval.

2. The method according to claim 1, wherein the step submitting transport protocol requests includes:

submitting a predetermined number of requests; and using a predetermined time-out interval between each request.

3. The method according to claim 1, wherein the step receiving response messages from the backup server includes receiving ICMP response messages.

4. The method according to claim 1, wherein the method is executed during a failover performed in a fault tolerant computer network.

5. The method according to claim 1, wherein the method is executed during a failover performed by network stations booting from remote servers.

6. The method according to claim 1, wherein the method is executed during a failover performed by network stations peer booting from another network station.

7. A computer program production a computer readable medium for adjusting failover intervals in a computer network, comprising:

instructions for submitting transport protocol requests to a backup server;

instructions for receiving response messages from the backup server; and instructions for adjusting the rate of transport protocol requests according to the response messages, wherein the step adjusting the rate of transport protocol requests includes instructions for providing an acceleration factor which is used in conjunction with ICMP responses and a boot attempt counter to determine the failover interval.

8. The computer program product according to claim 7, wherein the step submitting transport protocol requests includes: instructions instructions for submitting a predetermined number of requests; and instructions for using a predetermined time-out interval between each request.

9. The computer program product according to claim 7, wherein the step receiving response messages from the backup server includes instructions for receiving ICMP response messages.

10. The computer program product according to claim 7, wherein the instructions are executed during a failover performed in a fault tolerant computer network.

11. The computer program product according to claim 7, by network stations booting from remote servers.

12. The computer program product according to claim 7, wherein the instructions are executed during a failover performed by network stations peer booting from another network station.

13. A system for adjusting failover intervals in a computer network, comprising:

means of submitting transport protocol requests to a backup server;

means of receiving response messages from the backup server; and means of adjust the rate of transport protocol requests according to the response messages, wherein the step adjusting the rate of transport protocol requests includes providing an acceleration factor which is used in conjunction with ICMP responses and a boot attempt counter to determine the failover interval.

* * * * *

UNITED STATES PATENT AND TRADEMARK OFFICE
CERTIFICATE OF CORRECTION

| | |
|---|---|
| PATENT NO. | : 6,738,923 B1 |
| APPLICATION NO. | : 09/656672 |
| DATED | : May 18, 2004 |
| INVENTOR(S) | : Blam et al. |

Page 1 of 1

It is certified that error appears in the above-identified patent and that said Letters Patent is hereby corrected as shown below:

Col. 8, line 12: after "includes;" delete "instructions".

Col. 8, line 36: after "means of" delete "adjust" and insert --adjusting--.

Signed and Sealed this

Twenty-second Day of August, 2006

JON W. DUDAS
*Director of the United States Patent and Trademark Office*